R. F. BROWN.
SHEEP PROTECTOR.
APPLICATION FILED DEC. 11, 1915.
1,194,135.
Patented Aug. 8, 1916.
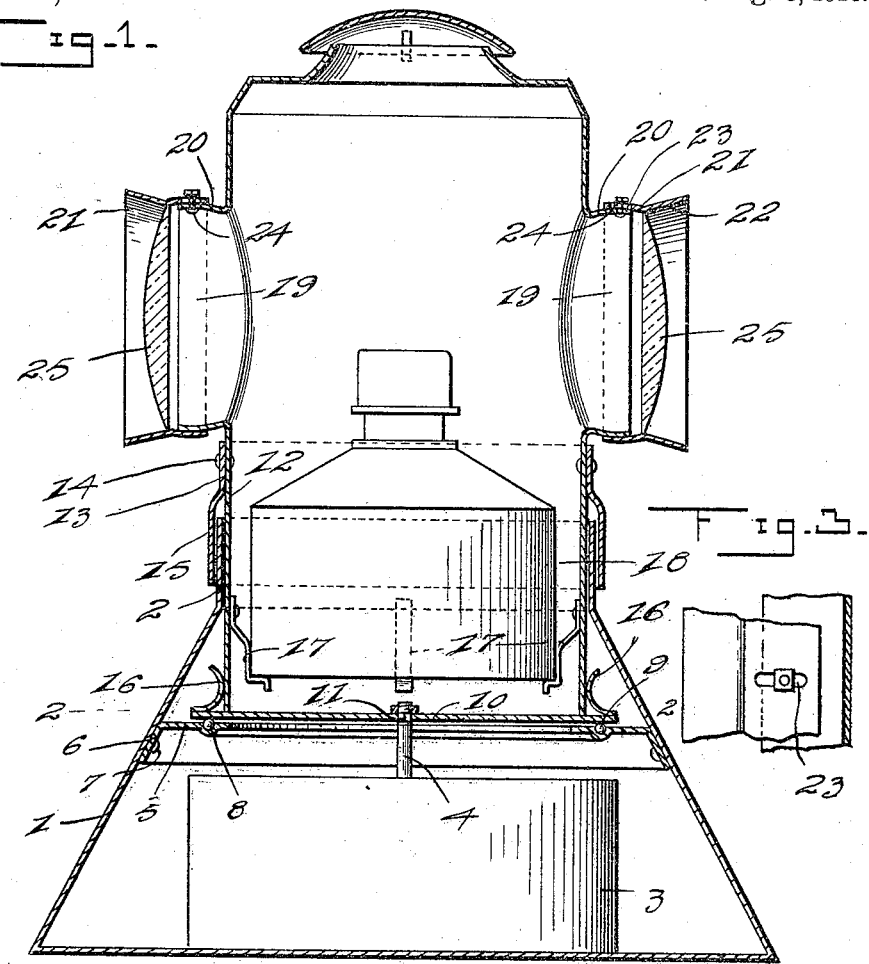
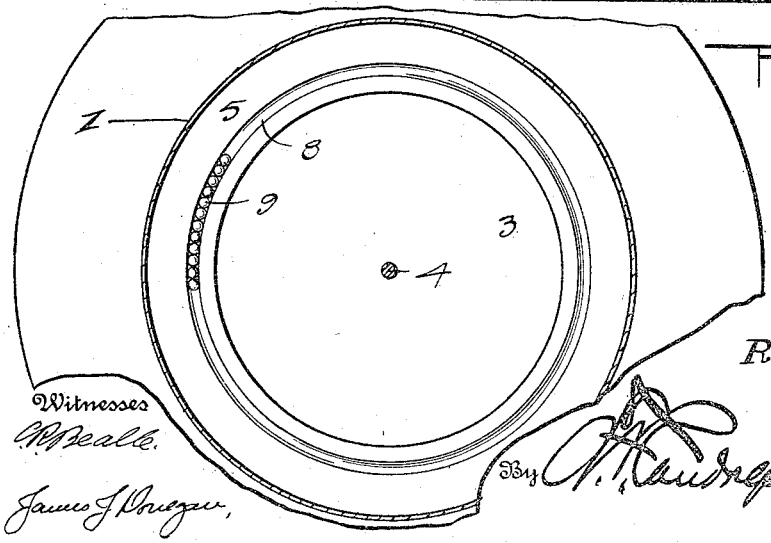
Witnesses
C. H. Beall.
James J. Driezer.
Inventor
R. F. Brown
By _____
Attorney

UNITED STATES PATENT OFFICE.

ROY F. BROWN, OF ENCINO, NEW MEXICO.

SHEEP-PROTECTOR.

1,194,135.  Specification of Letters Patent.  Patented Aug. 8, 1916.

Application filed December 11, 1915. Serial No. 66,336.

*To all whom it may concern:*

Be it known that I, ROY F. BROWN, a citizen of the United States, residing at Encino, in the county of Torrance and State of New Mexico, have invented certain new and useful Improvements in Sheep-Protectors; and I do hereby declare the following to be a full, clear, and exact description of the invention, such as will enable others skilled in the art to which it appertains to make and use the same.

The primary object of this invention is to protect sheep, from the approach of wild animals, while confined at night within a bed-ground.

Another object of the invention is to provide a device for carrying out the above object, in the nature of a light, designed to be rotatably positioned on a support located within the bed-ground and near the sheep, the said light being adapted when rotated to throw the rays thereof in a circular path so as to confuse the approaching wild animals.

A further object of the invention is to provide a light for carrying out the above objects, which will be of simple construction, cheap to manufacture, will be durable, efficient in operation and which will be provided with a pair of relatively vertically adjustable lenses, so that a portion of the rays of light can be directed upwardly and another portion downwardly.

Other objects will appear and be better understood from that embodiment of my invention of which the following is a specification, reference being had to the accompanying drawings forming a part thereof in which:—

Figure 1 is a vertical sectional view taken through the light. Fig. 2 is a horizontal section on the line 2—2 of Fig. 1. Fig. 3 is a detail sectional view showing the manner in which the lenses are connected to the lantern casing.

Referring to the drawings in detail, the numeral 1 designates the conical hollow base, the apex end of which is opened and formed to provide an annular collar 2. Located within the base 1 and resting on the bottom wall thereof is a motor 3, which is provided with a vertical rotating shaft 4, which loosely extends through a central aperture formed in a plate 5 disposed above the motor 3 and which has annular depending and outwardly extending flange 6 which engages against the inner surfaces of the walls of the conical base 1 and is secured thereto by means of fastening elements 7. The plate 5 has its upper side provided with an annular groove 8 which forms a race for ball bearings 9, upon which is rotatably mounted a disk 10. The disk 10 is provided, centrally, with a squared opening which receives the uppper end of the shaft 4, the said upper end of the shaft being squared as shown at 11 so as to lock the disk to the shaft and cause the same to rotate with the shaft when the latter is rotated.

A lantern casing 12 has one end extending through the apex end of the base and into the interior of the base and resting upon the upper side of the disk 10. The walls of the lantern casing 12 are arranged in spaced relation with the inner side of the collar 2 and said lantern casing is provided with a flanged collar 13 which encircles the body and is secured thereto at a point above the collar 2 of the base, by means of fastening elements 14, the flange portion 15 of the collar engaging over the collar 2 on the base and spaced therefrom, as shown in Fig. 1 of the drawings.

The disk 10, carries a plurality of inwardly bowed spring clips 16 which engage against the lower end of the lantern casing 12 and lock the body to the disk so as to cause the body to rotate with the disk when the latter is rotated.

The lantern casing 12 has its inner surface which extends into the base portion 1, provided with a plurality of depending brackets 17, upon which rests a burner 18.

The lantern casing 12, is provided adjacent its upper end, and at diametrically opposite points with openings 19, the walls of the openings being bent outwardly so as to provide laterally disposed cylindrical extensions 20. Adjustably mounted on the extensions 20 are cylindrical shaped lens holders 21. Each of these lens holders 21 has one end engaging over the adjacent extension 20 and has the wall at its outer end thereof flaring outwardly as shown at 22. The lens holders 21 have those ends which engage over the extensions 20 provided with elongated slots 23 which receive the shanks of bolts 24 carried by the extensions 20, as shown in Figs. 1 and 3 of the drawings. When it is desired to tilt the lens holders 21 either in an upward or downward direction, the nuts which are threadably mounted on the upper ends of the bolts 24 are loosened and the said lens holders are then adjusted to the desired position, after which operation the nuts are again tightened against the adjacent lens holders so as to hold the latter in their adjusted positions. Each lens holder 21 has positioned therewithin a glass lens 25, which is located at a point midway between the opposite ends of the respective lens holder. The burner 18 is so positioned, with respect to the lenses 25, that the flame will be in direct alinement with the opposed lenses.

In use the base 1 is positioned on a support, not shown, so as to efficiently elevate the light above the ground and the motor 3, which is preferably in the nature of a spring motor, started so as to cause the lantern casing 12 to rotate and throw the rays of light in a circular path. If it is desired to throw a portion of the light rays upwardly and another portion downwardly, the respective lens holders 21 are adjusted in the manner above stated, and thereby permitting the light rays to cover a large area.

Having thus described my invention what I claim as new is:—

1. A device of the character described comprising a hollow base, a vertically disposed rotatable shaft located within the base, a disk carried by the upper end of the shaft and adapted to rotate therewith, a lantern casing having one end extending into the base and resting on the disk, the said lantern casing having lens receiving openings adjacent its upper end, a burner positioned within the lantern casing, and means for securing the body to the disk so as to cause the casing to rotate with the disk when the shaft is rotated and means for rotating the shaft.

2. A device of the class described comprising a base, a lantern casing revolubly associated with the base and provided with diametrically opposed openings, lateral cylindrical extensions projecting outwardly from the walls of the opening, lens holders adjustably mounted on the extensions and each adapted to receive a lens, means for holding the holders in adjusted positions and a burner positioned within the lantern casing.

In testimony whereof I affix my signature in presence of two witnesses.

ROY F. BROWN.

Witnesses:
R. A. ARCHULETTA,
E. G. HUTSON.

Copies of this patent may be obtained for five cents each, by addressing the "Commissioner of Patents, Washington, D. C."